3 Sheets--Sheet 1.
E. A. MAEDEL.
Music-Leaf Turner.
No. 160,449.
Patented March 2, 1875.
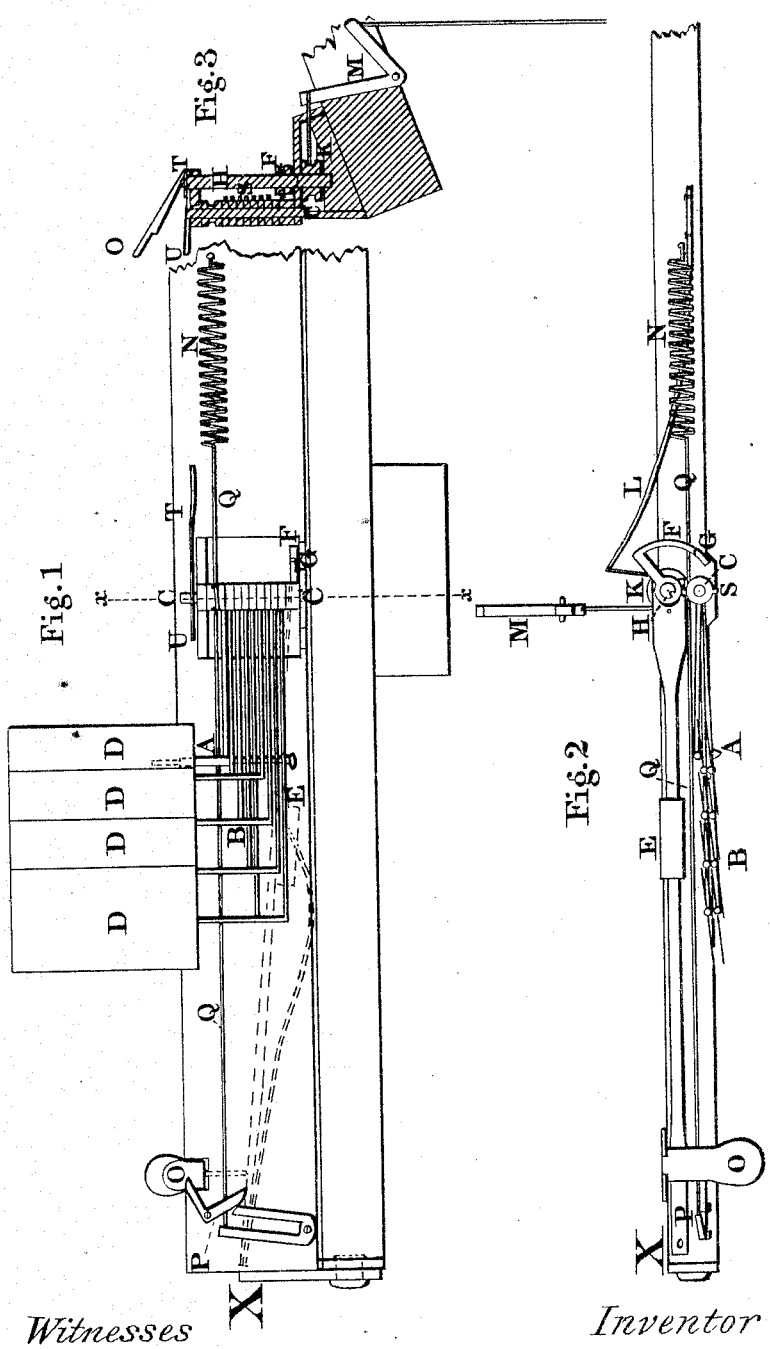
Witnesses
August Hoester
Ch. B. Maedel
Inventor
E. A. Maedel

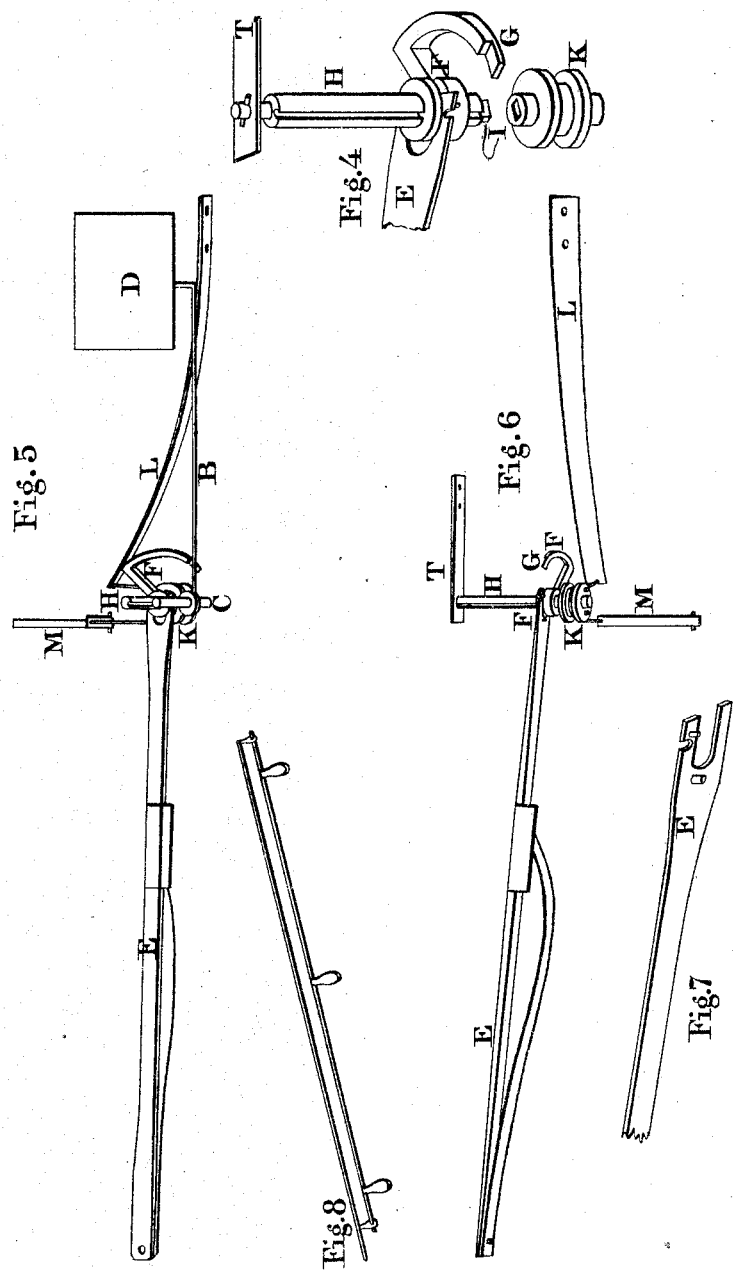

3 Sheets--Sheet 3.
E. A. MAEDEL.
Music-Leaf Turner.
No. 160,449.
Patented March 2, 1875.
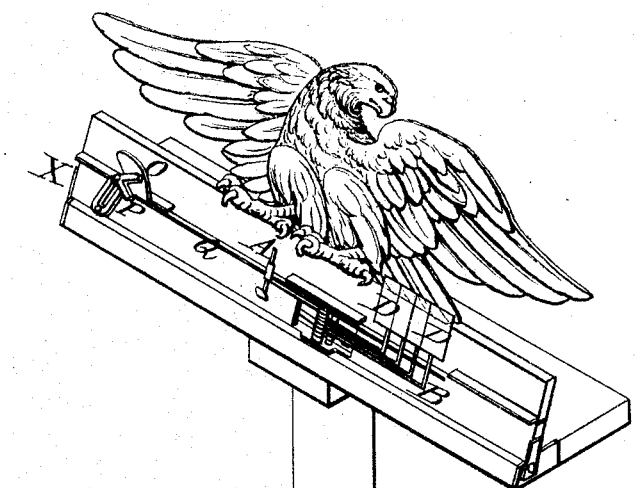
Fig. 9
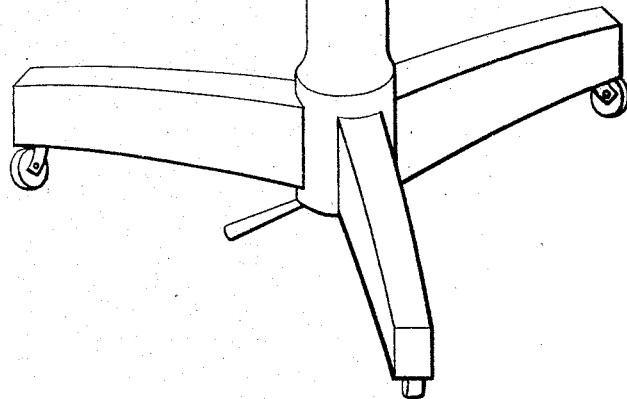
Witnesses
August Hoester
Ch. B. Maedel
Inventor
E. A. Maedel

UNITED STATES PATENT OFFICE.

ERNST A. MAEDEL, OF WASHINGTON, DISTRICT OF COLUMBIA.

IMPROVEMENT IN MUSIC-LEAF TURNERS.

Specification forming part of Letters Patent No. 160,449, dated March 2, 1875; application filed October 2, 1874.

*To all whom it may concern:*

Be it known that I, ERNST A. MAEDEL, of Washington, District of Columbia, have invented a Machine for Turning the Leaves of a Piece of Music or of a Music-Book, with particular reference to its application on pianos, organs, melodeons, and music-stands, of which the following is a specification:

The object of my invention is to promptly turn forward without use of the hands the leaves of pieces of music, and by an easy and natural motion of the hand any number promptly back again for repetition, according as a sliding "gatherer" may have been set.

In the accompanying drawings, Figure 1 is a front elevation; Fig. 2, a plan view; Fig. 3, a vertical section, marked out by a broken line, $x\ x$, upon Fig. 1. Figs. 4, 5, 6, 7, and 8 represent portions of the mechanism detached; and Fig. 9 is a perspective view of my invention.

The leaves are turned by a series of wire arms, B, which move around a common axis, C, and have, by means of hinges or ferrules, or both combined, catchers D, of small mica plates or other material, attached to them, which are easily brought into position ready to push or turn. Against these wire arms, and in the direction from right to left, is pressed, by a properly-formed spring attachment, E, a driver, F, whose notch G will always take hold of the arm to be turned next. This driver is by a pin connected to a grooved shaft, H, along which it may slide to follow up one wire arm after the other; and the squared end I, Fig. 4, of the shaft fits precisely into a corresponding hole of the axle of a pulley, K, thus forming a coupling. This pulley K, of which the cord has one end fastened to a spring, L, and the other connected by elbow-lever M and a rod to the pedal, will, whenever the pedal is pressed down, move at once the shaft, driver, the arm with the catcher, and what is held in it. As soon as the pressure upon the pedal ceases the spring L draws back the pulley K, shaft H, and driver F, all connected with each other, the driver F taking hold of the next wire arm B preparatory to its turning. The gatherer A, Fig. 1, essentially another pulley, into which an arm is fastened, carries back by an opposite motion the wire arms to their original place, if desired. It revolves around the same axis, C, Fig. 1, with all the wire arms, is kept in normal position by a spring, N, to which one end of its cord is attached, and is moved by pressure upon a small lever, O, this latter working against a compound lever, P, to which the other end of the cord Q is fastened. The small lever O thus moves back simultaneously the wire arms B and the driver F to the point of commencement.

To prevent mere friction carrying forward more than one wire arm at a time, each one has inserted a short pin, S, Fig. 2, near its pivot end, which rests against another one inserted in the spring attachment E, Figs. 4 and 7, of the driver F, and is there so arranged as to reach only the second next of the wire arms for retention.

The shaft H, Fig. 4, is the only piece which connects the portion of mechanism in the upward standing part of the desk with the portion in the horizontal part of the desk. It is kept securely in its position in the socketed pulley K by a flat spring, T, and may be lifted out with the lever U, attached for this purpose—if the upward portion or box X, which is hinged, must be leveled, as in pianos, for instance, to shut the piano-cover.

To make the mechanism serviceable in all cases, a long pin, Fig. 8, with clamps attached to hold single leaves in proper position, may be inserted as an extension from the axis C.

I claim as my invention—

1. In a leaf-turner, the combination of a series of swinging arms and catchers with shaft H, and its curved lever F arranged to slide thereon, substantially as described.

2. In combination with shaft H, the swinging arms, curved and sliding lever F, and the spring E, constructed and arranged to operate substantially as described.

3. In combination with shaft H, swinging arms, and sliding lever F, the spring E, the pulley K, and spring L, all arranged to operate substantially as described.

4. The shaft H and sliding curved lever F, with its spring E, the pulley K, spring L, and elbow-lever M, all combined and arranged to operate substantially as described.

5. In combination with swinging arms and catchers, the gatherer A, cord Q, spring N, and compound lever P, substantially as described.

6. In combination with shaft H and hinged box X, the flat spring T, substantially as described.

7. The combination of swinging arms and catchers with shaft H, sliding lever F, having spring E, pulley K, spring L, and elbow-lever, the rod and pedal, the gatherer A, with its adjustable slide, and the hinged box X, all substantially as described.

E. A. MAEDEL.

Witnesses:
CH. B. MAEDEL,
AUGUST HOESTER.